(12) United States Patent
Abu-Amara

(10) Patent No.: US 7,769,380 B2
(45) Date of Patent: Aug. 3, 2010

(54) METHOD FOR REDUCING THE RATE OF REGISTRATION IN CDMA-BASED MOBILE NETWORKS

(75) Inventor: Marwan Hassan Abu-Amara, Dhahran (SA)

(73) Assignee: King Fahd University of Petroleum and Minerals (SA)

( * ) Notice: Subject to any disclaimer, the term of this patent is extended or adjusted under 35 U.S.C. 154(b) by 895 days.

(21) Appl. No.: 11/641,709

(22) Filed: Dec. 20, 2006

(65) Prior Publication Data

US 2008/0153483 A1 Jun. 26, 2008

(51) Int. Cl.
*H04Q 7/20* (2006.01)

(52) U.S. Cl. .............. 455/435.1; 455/456.6; 455/456.1; 455/440; 455/574; 455/437; 370/535; 370/430; 370/331; 370/279; 375/295; 375/298; 375/291

(58) Field of Classification Search .............. 455/456.6, 455/456.1, 440, 574, 437, 515, 535, 430, 455/331, 279; 370/535, 430, 331, 27, 338; 709/202; 376/295, 296, 291
See application file for complete search history.

(56) References Cited

U.S. PATENT DOCUMENTS

| | | | |
|---|---|---|---|
| 5,323,418 | A | 6/1994 | Ayerst |
| 5,548,616 | A | 8/1996 | Mucke |
| 5,799,005 | A | 8/1998 | Soliman |
| 6,034,635 | A | 3/2000 | Gilhousen |
| 6,115,409 | A | 9/2000 | Upadhyay |
| 6,240,292 | B1 | 5/2001 | Haberman |
| 6,362,778 | B2 * | 3/2002 | Neher ................... 342/357.07 |
| 6,542,743 | B1 | 4/2003 | Soliman |
| 6,654,362 | B1 | 11/2003 | Palamara |
| 6,697,622 | B1 | 2/2004 | Ishikawa |
| 6,831,905 | B1 | 12/2004 | Lomp |
| 6,885,652 | B1 | 4/2005 | Ozukturk |
| 6,954,644 | B2 | 10/2005 | Johansson |
| 6,957,068 | B2 | 10/2005 | Hutchison |
| 6,961,543 | B2 | 11/2005 | Hunzinger |
| 6,965,585 | B2 | 11/2005 | Grilli |
| 7,277,708 | B2 * | 10/2007 | Nakatsugawa et al. ...... 455/437 |

(Continued)

FOREIGN PATENT DOCUMENTS

JP 2001169337 6/2001

(Continued)

*Primary Examiner*—Rafael Pérez-Gutiérrez
*Assistant Examiner*—Joseph Arevalo
(74) *Attorney, Agent, or Firm*—Richard C. Litman

(57) ABSTRACT

The method for reducing the rate of registration in CDMA-based mobile networks is a method for preventing a traveling mobile device from registering within a new, or secondary, registration area, prior to physically relocating from a first, or current, registration area to the new registration area. The mobile device has a storage memory associated therewith, for storing a database containing geographic coordinates defining boundaries of a plurality of registration areas. The mobile device scans for a new registration pilot signal associated with a new registration area, and upon detection, the geographic location of the mobile device is determined. This geographic location is compared with the coordinates of the boundaries stored within the database, and if the mobile device is determined to be within the boundary defining the new registration area, the mobile device is then registered with a base station of the new registration area.

2 Claims, 3 Drawing Sheets

U.S. PATENT DOCUMENTS

| | | |
|---|---|---|
| 2001/0021179 A1 | 9/2001 | Tiedemann, Jr. |
| 2003/0119496 A1 | 6/2003 | Gaal |
| 2003/0193914 A1 | 10/2003 | Lomp |
| 2003/0222819 A1 | 12/2003 | Karr |
| 2004/0090931 A1 | 5/2004 | Proctor, Jr. |
| 2004/0217901 A1 | 11/2004 | Turetzky |
| 2004/0252668 A1 | 12/2004 | Ozukturk |
| 2005/0032513 A1 | 2/2005 | Norman |
| 2005/0078031 A1 | 4/2005 | Park |
| 2005/0148346 A1* | 7/2005 | Maloney et al. .......... 455/456.6 |
| 2005/0201330 A1* | 9/2005 | Park et al. ................... 370/331 |
| 2006/0271618 A1* | 11/2006 | Kokubo et al. .............. 709/202 |

FOREIGN PATENT DOCUMENTS

| | | |
|---|---|---|
| WO | WO 97/33448 | 9/1997 |

\* cited by examiner

METHOD FOR REDUCING THE RATE OF REGISTRATION IN CDMA-BASED MOBILE NETWORKS

BACKGROUND OF THE INVENTION

1. Field of the Invention

The present invention relates to a method for reducing the rate of registration in code division multiple access (CDMA)-based mobile networks. The method prevents a traveling mobile device, such as a cellular telephone enabled for CDMA, for example, from registering within a new, or secondary, registration area, prior to physically relocating from a first, or current, registration area to the new registration area.

2. Description of the Related Art

Code division multiple access (CDMA) is a multiplexing scheme which encodes data with a special code associated with each channel utilized by a mobile device, and uses the constructive interference properties of the special codes to perform multiplexing operations. One of the advantages of the CDMA methodology is that a "soft handoff" may be performed by a mobile device. A soft handoff, as the technique is commonly referred to in the art, includes the addition of a second base station transceiver subsystem (BTS) to a connection to improve the link budget for users on the edge of a cell. As a result, signal quality and handoff robustness are both improved for edge users in a CDMA system.

In the CDMA system, neighboring cells typically all use the same frequency for transmission and the cells, or base station subsystems associated with each cell, are distinguished by means of a number, commonly referred to as the pseudo-noise (PN) offset. The PN offset is a time offset from the beginning of a well-known pseudo-random noise sequence, which is used to spread the signal from the BTS. With all of the cells operating on the same frequency, digital signal processing based on the offsets from the PN sequence is required to listen to different base station subsystems, rather than radio frequency (RF) transmission and reception based on separate frequencies.

As a CDMA enabled mobile device, such as a cellular telephone, for example, roams through its associated cellular network, the mobile device detects the PN offsets of the neighboring cells and reports the strength of each signal back to the reference cell of the call (usually the strongest cell, in terms of signal strength). If the signal from a neighboring cell is strong enough, the mobile will be directed to "add a leg", as the process is commonly referred to in the art, to its call, and start transmitting and receiving to and from the new cell, in addition to the cell (or cells) already hosting the call. The signals generated by each BTS associated with a particular cell, used for registration, are commonly referred to as "pilot signals" in the art, as they are used for guidance of the mobile device communications.

Likewise, if a cell's signal becomes too weak, the mobile device is directed to "drop" that particular leg. Following this procedure, the mobile device can move from cell to cell and add and drop legs as necessary, in order to keep the call up without ever dropping the link, and interrupting communications.

With the rapid deployment of mobile services around the globe, service providers are presently either using or planning to use a pure CDMA technology, or a technology that is based on CDMA, such as the Universal Mobile Telecommunications System (UMTS), for example. One key process by which the mobile device identifies its location and parameters to a BTS is through "registration". Through registration, the CDMA-based mobile network is able to route incoming calls properly to the desired mobile device.

The present standard of the Telecommunications Industry Association (TIA), commonly referred to as the TIA-2000.5-D standard, provides twelve different types of registration methods implemented in CDMA networks, namely: (1) power-up; (2) power-down; (3) timer-based; (4) distance-based; (5) zone-based; (6) parameter-change; (7) ordered; (8) implicit; (9) traffic channel; (10) user zone; (11) encryption/message integrity re-sync required; and (12) broadcast multicast (BCMC). The first six forms of registration listed above are commonly referred to as "autonomous registration". In autonomous registration, the mobile device initiates a registration process based upon a particular criteria, for example, turning on or off the mobile device, expiration of a timer, entering a new area or zone, or the distance between the new cell associated with a particular BTS and the last visited cell associated with the previous BTS exceeding a particular threshold.

All types of CDMA registrations, particularly the mobile device-initiated autonomous registrations, have a direct impact and effect on the CDMA access channel and the paging channel capacities, as well as the capacities of the network entities, such as, for example, the BTS, the base station controller (BSC), the mobile switching center (MSC), the home location register (HLR), and the interconnecting links. It would be desirable to reduce the rate of CDMA registrations which a mobile device makes, as this reduction will help to maximize the usage of the system capacities, including the access channel capacity, the paging channel capacity, and the network entities' capacities.

The rate of the mobile device registration is dependent upon a wide variety of factors, such as, for example, the proximity of the mobile device to a registration boundary. In this exemplary case, the parameter-change registration may yield a high amount of mobile device registrations due to the fact that random RF environment changes on the registration boundary (due to, for example, the mobility of mobile device users and other sources of scattering) may bring about a change in the mobile device's parameters which requires the mobile device to perform a parameter-change registration.

In order to minimize such a possible high rate of registration, either a registration method based on the expiration of a timer (i.e., timer-based or zone-based registrations) or a distance-based registration may be utilized. However, using a method of registration based upon the expiration of a timer may lead to the problem of missed calls, particularly in cases where the mobile device crosses the registration boundary between two MSCs. As an example, we may consider a scenario where a mobile device has passed between two registration areas, but the timer did not expire. Thus, the mobile device did not update its location through registration while a call to the mobile device was incoming. If the MSC does not cover the area that the mobile device is currently visiting, the call will be missed by the mobile device, even if the timer has not yet expired.

A distance-based registration methodology also does not yield: an accurate identification of the mobile device's present location, and further does not take into account the signal strength of both the new BTS and the last visited BTS as measured by the mobile device. In such a scenario, the mobile device may register prematurely, which can lead to an excessive number of registrations.

The art teachings, taken either singly or in combination, are not seen to describe the instant invention as claimed. Thus, a method for reducing the rate of registration in CDMA-based mobile networks solving the aforementioned problems is desired.

SUMMARY OF THE INVENTION

The method for reducing the rate of registration in CDMA-based mobile networks is a method for preventing a traveling mobile device, such as a cellular telephone enabled for code division multiple access (CDMA), for example, from registering within a new, or secondary, registration area, prior to physically relocating from a first, or current, registration area to the new registration area. The mobile device has a storage memory associated therewith, for storing a database containing geographic coordinates defining boundaries of a plurality of registration areas. The mobile device is initially located within a first registration area and, within that area, preferably measures the signal strength of a first registration pilot signal associated with that area.

The mobile device further scans for a new registration pilot signal associated with a new registration area and, upon detection, the geographic location of the mobile device is determined. The mobile device further measures the signal strength of the new registration pilot signal. The geographic location is determined either through the reception of locating signals from the global positioning system (GPS) or, if the phone is not GPS-enabled, through comparison of the signal strengths of, respectively, the current registration pilot signal and the new registration pilot signal.

If the mobile device is GPS-enabled, the actual physical coordinates of the mobile device are compared with the coordinates of the boundaries stored within the database, and if the mobile device is determined to be within the boundary defining the new registration area, the mobile device is then registered with a base station of the new registration area. If the actual coordinates of the mobile device are still within the boundary defining the first, or initial, registration area, then the mobile device takes a second measurement of the strength of the new registration pilot signal.

Upon initial registration, a signal strength difference threshold, $\Delta$, is defined and transmitted to the mobile device. $\Delta$ may be stored in the database of the mobile device. The difference between the second measurement and the first measurement of the new registration pilot signals is computed, and if the difference is less than $\Delta$, then the mobile device returns to scanning for another new registration pilot signal. If the difference is greater than $\Delta$, then the mobile device remains registered within the initial registration area and, noting that the mobile device is assumed to be traveling, the mobile device returns to determining the present physical coordinates of itself and the user, and comparing these to the boundary coordinates stored within the database.

If the mobile device is not GPS-enabled, then the mobile device compares the measured strength of the new registration pilot signal to that of the initial, or current, registration pilot signal. If the strength of the new registration pilot signal is greater than that of the current registration pilot signal, then the actual physical coordinates of the device are estimated, based upon the incoming signal from the new base station of the new registration area, and the mobile device compares these estimated coordinates to those of the boundaries stored within the database, as described above for the GPS-enabled mobile device.

If the strength of the new registration pilot signal is less than the measured strength of the current registration pilot signal, then the mobile device remains registered within the current, or initial, registration area and resumes scanning for a new registration pilot signal.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
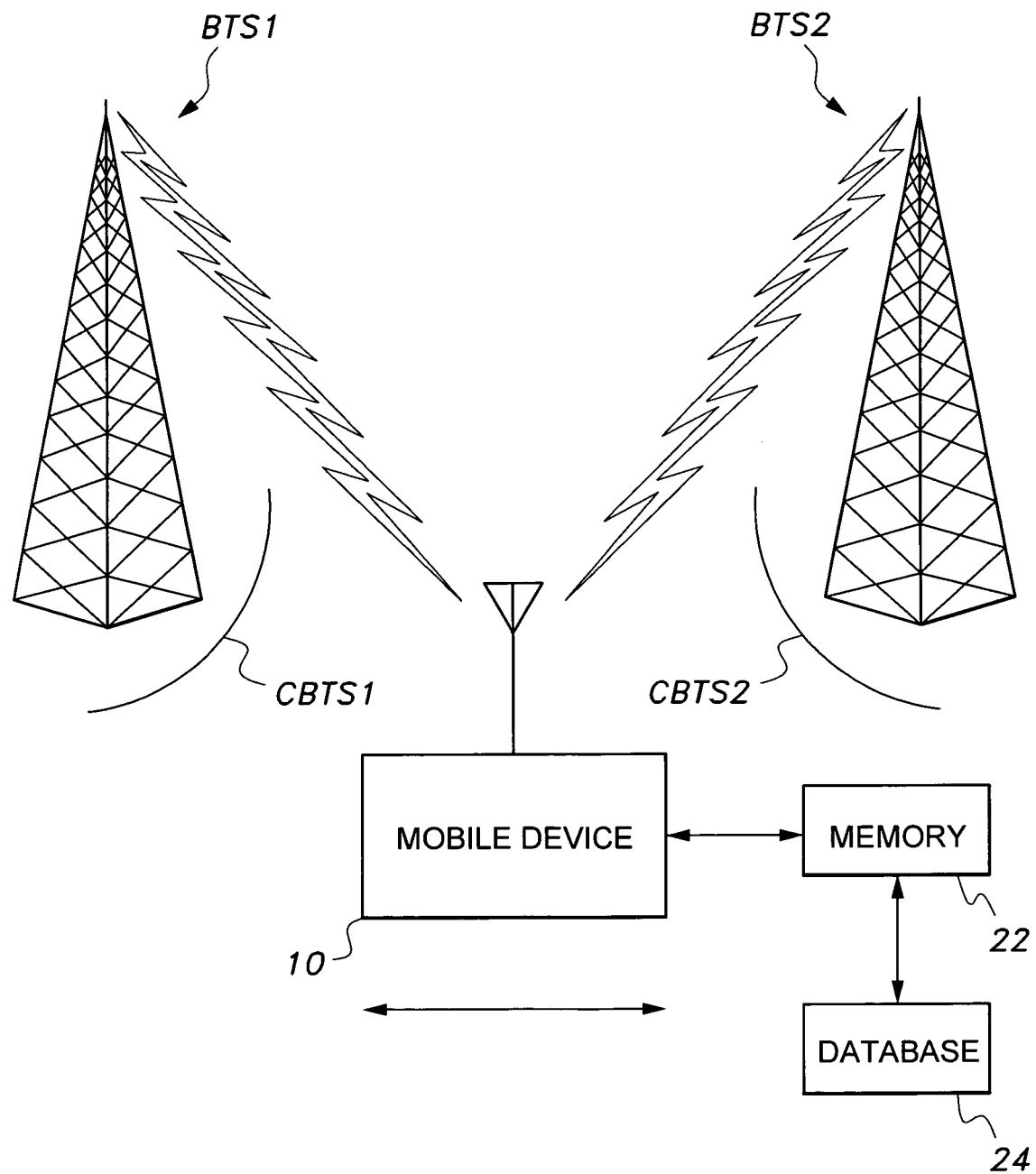
FIG. 1 is a simplified schematic view of a mobile device positioned between registration areas for implementation of the method for reducing the rate of registration in CDMA-based mobile networks according to the present invention.

FIG. 1 illustrates a mobile device 10, such as a cellular telephone, for example, which is enabled for CDMA. In FIG. 1, mobile device 10 is in transit between two cells CBTS1, CBTS2 associated, respectively, with base station subsystems BTS1 and BTS2. In order to properly send and receive calls, the mobile device 10 must register in the appropriate cell, so that the cellular network system knows where to transmit the cellular signal. In order to maintain signal integrity, and prevent interruptions in communications (such as missed telephone calls, for example), mobile device 10 should remain registered with BTS1 when mobile device 10 is within the boundary of CBTS1, and should only register with BTS2 following crossing the boundary between CBTS1 and CBTS2.

Figure 2:
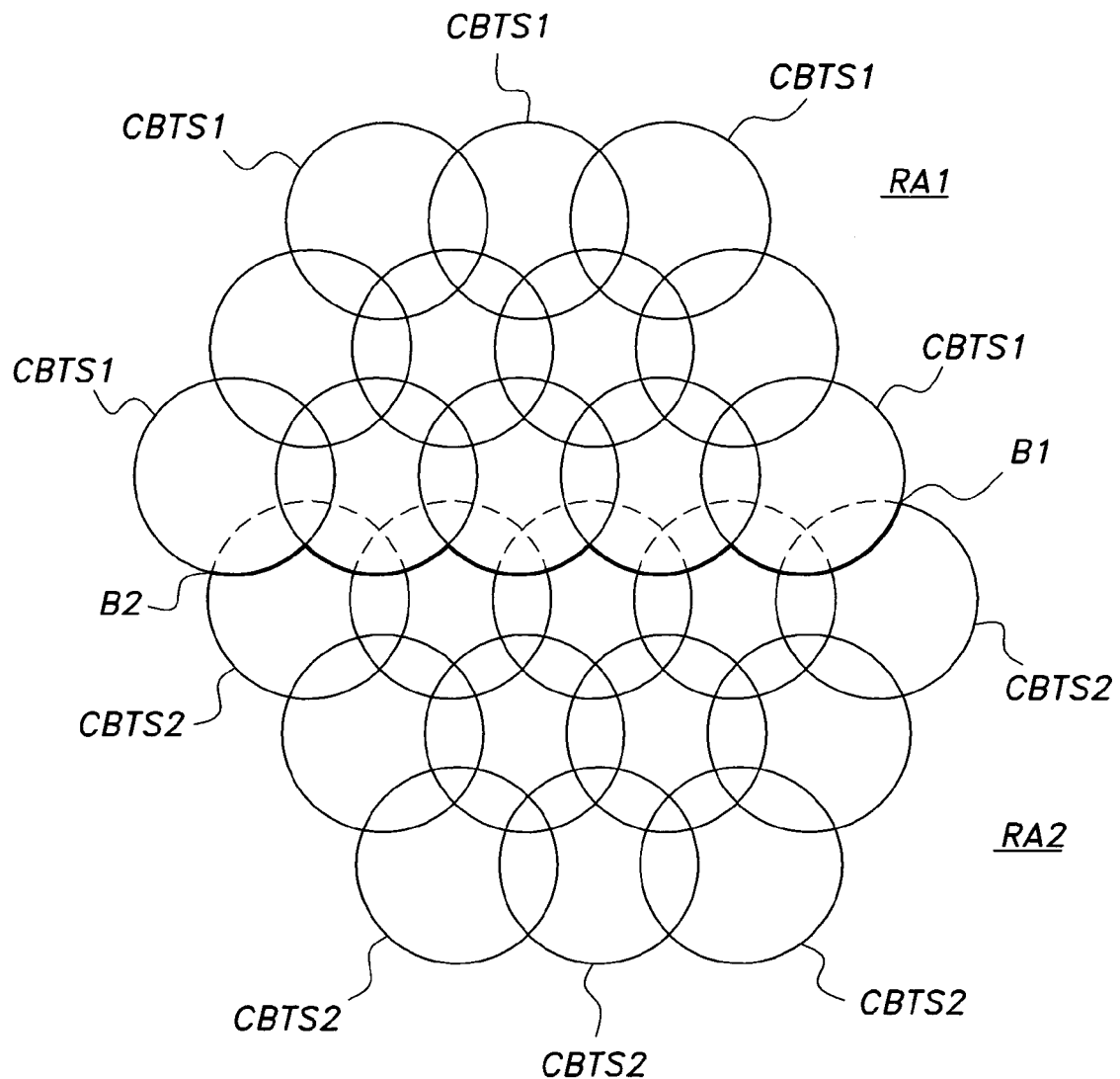
FIG. 2 is a simplified schematic diagram of a pair of intersecting registration areas, each defined by a plurality of cells.

FIG. 1 represents a simplified cellular system. In reality, a registration area, or zone, is comprised of a large number of cells associated with respective base station subsystems. Each cell is represented by a circle in FIG. 2. First registration area RA1 is defined by the overlapping cells CBTS1, and second registration area RA2 is defined by the overlapping cells CBTS2. The thick boundary line B1 represents the physical boundary of registration area RA1, and the dotted boundary line B2 represents the physical boundary of registration area RA2. If mobile device 10 travels between RA1 and RA2, in order not to miss calls, mobile device 10 will need to register with the base station subsystems of RA2, preferably not prematurely (i.e., prior to physically crossing B2). Registration areas, or zones, are regions in which mobile stations, such as mobile device 10, register (typically, only once), and which consist of a predetermined number of BTSs, operated and maintained by a network operator.

If mobile device 10 moves from RA1 to RA2, then even if mobile device 10 detects RA2's signal before crossing boundary B1, mobile device 10 should not register with RA2 until boundary B1 is crossed. A premature registration with RA2 will result in an excessive number of registrations, which will greatly slow down the transmission and reception rate of calls, both on mobile device 10 and within the cellular network. Similarly, if mobile device 10 moves from RA2 to RA1, it is necessary that if mobile device 10 detects RA1's signal before crossing boundary B2, mobile device 10 should not register with RA1 until boundary B2 is actually crossed.

A premature registration may occur if the signal of the new registration region or cell becomes stronger than the signal of the current region or cell. This increase in signal strength may be due to uncontrollable environmental factors, such as, for example, random RF environment changes on the registration boundary due to a multiplicity of mobile device users, or other sources of transmission and scattering.

In order to prevent premature registration, the mobile device 10 must check whether it has gone beyond the boundary for the current registration area by checking the current mobile device's physical location coordinates against the known coordinates of the boundary. If the mobile device 10 is allowed to prematurely register with the new registration area through the new BTS, then as the RF environment changes on the registration boundary in favor of the previous BTS that the mobile device was registered with, the mobile device will re-register with the previous registration area through the previous BTS. This creates an oscillation between registrations with the previous registration area and the new registration area. The result of this oscillation is an excessive number of registrations, which will have a negative impact, in terms of signal processing resources, on system capacities, including the access channel capacity, the paging channel capacity, and the network entities' capacity.

Figure 3:
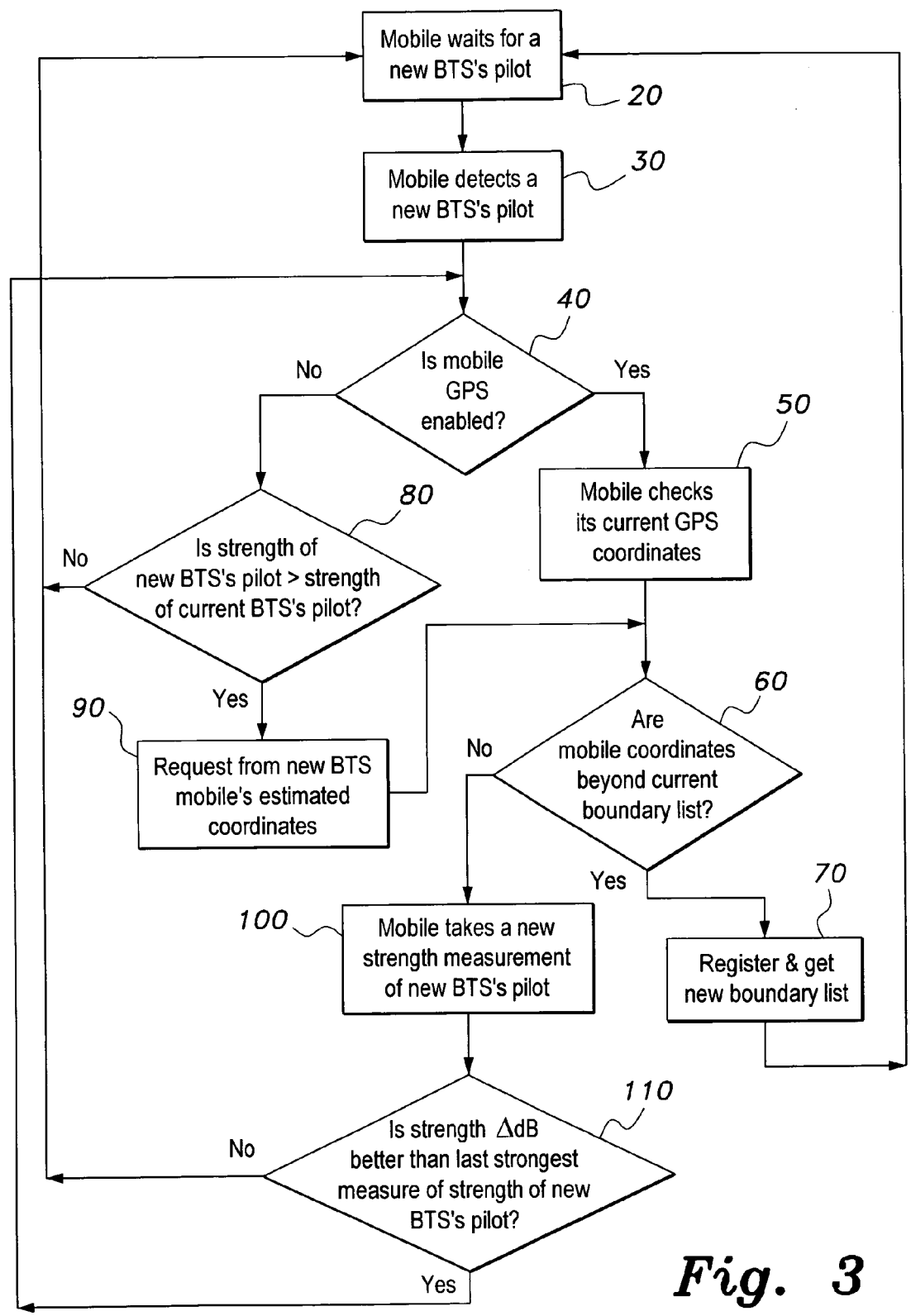
FIG. 3 is a flow diagram of the method for reducing the rate of registration in CDMA-based mobile networks according to the present invention.

As illustrated in the flow diagram of FIG. 3, the method for reducing the rate of registration in CDMA-based mobile networks begins with mobile device 10, located in a first registration area associated with a first (or "current") BTS, being placed in a continuous scanning mode, with mobile device 10 awaiting receipt of a registration pilot signal from a new BTS (step 20). At step 30, mobile device 10 detects a new registration pilot signal generated by a new BTS. Upon detecting the new pilot signal in step 30, the mobile device 10 makes a first measurement of the strength, or intensity, of the new registration pilot signal. In order to determine the physical location of mobile device 10 (to ultimately determine which registration area the mobile device 10 should utilize and prevent lost calls), at step 40, a determination is made as to whether mobile device 10 is enabled to receive location signals from the global positioning system (GPS).

If mobile device 10 is GPS-enabled, then the method passes to step 50, in which mobile device 10 determines its physical location, based upon received GPS coordinates, and compares these coordinates of the device's actual physical location with a listing of coordinates associated with known registration area boundaries. Referencing FIG. 1, these coordinates of registration area boundaries may be stored within a database 24, either located in the storage memory 22 associated with the mobile device 10, or located at a separate site accessible to the mobile device 10. The boundary listings stored within database 24 may consist of geographical coordinates, given in latitude and longitude, for example, defining the physical boundaries of the particular registration areas.

At this step, the mobile device's current set registration area is defined by the MSC at which the mobile device 10 last registered. At step 60, the mobile device's actual physical location, defined by the GPS coordinates, is compared to the coordinates of registration area boundaries stored within the boundary listing of the database 24. If the mobile device's physical location is outside of the boundaries defining the mobile device's current set registration area then, at step 70, the mobile device 10 registers with the MSC of the new BTS, and returns to the continual scanning mode of step 20.

If the actual physical location of the mobile device 10, defined by the GPS coordinates, is still within the boundary of the current set registration area, then the mobile device 10 takes a measurement of the signal strength of the new BTS's pilot signal (step 100) and compares this signal strength with the last strongest measurement of the same pilot signal generated by the new BTS (step 110). Preferably, at step 30, when the mobile device 10 first detects a new registration pilot signal, the strength of the new registration pilot signal is measured and recorded. At step 100 a second measurement of signal strength is taken and compared with the initial measurement of the strength of the new registration pilot signal.

A threshold difference in signal strengths, Δ (which may be measured in dB or any other suitable signal strength measurement), may be user-defined or configured by the network operator, and delivered to the mobile device 10 upon initial registration. The choice of Δ affects the rate at which the mobile device checks on whether it is getting closer to entering the new registration area or not.

In the comparison of step 110, if the new measurement of signal strength is at least Δ db greater than the last strongest measurement of the pilot signal strength, then mobile device 10 returns to the determination of its physical location in step 50. The use of a set threshold prevents a false determination of greater signal strength (and, thus, premature registration) due to other users generating RF signals, atmospheric interference and scattering, etc. If the difference in signal strength is less than Δ db, then mobile device 10 returns to the scanning mode of step 20. It should be understood that mobile device 10 is assumed to be in transit, thus the physical location of the mobile device 10 will continuously be checked to determine the appropriate registration area associated with the mobile device.

If the mobile device 10 is not GPS-enabled (the determination being made in step 40), then the signal strength of the new BTS's registration pilot signal is compared against the signal strength of the current BTS's registration pilot signal (step 80). The current BTS's registration pilot signal is the signal strength of the pilot signal generated by the BTS currently serving the mobile device 10, in the current set registration area. Preferably, upon initial registration with a registration area, the mobile device 10 makes a measurement of the pilot signal strength associated with the BTS of that registration area.

If the signal strength of the new BTS's pilot signal is stronger than that of the current BTS's pilot signal, then the mobile device 10 will request a set of estimated coordinates from the new BTS (step 90), utilizing conventional techniques, such as, for example, measuring the received signal level, measuring the time of arrival of the pilot signal, measuring the angle of arrival of the pilot signal, or a combination thereof. The new BTS may, alternatively, transmit a location signal associated therewith.

Upon determination and receipt of the set of estimated coordinates, mobile device 10 compares the estimated coordinates against the boundary coordinates stored in the database 24 and returns to step 60, to determine whether the estimated physical location of mobile device 10 falls within the registration area boundaries of the boundary listing stored within the database 24.

If the signal strength of the new BTS's pilot signal is not stronger than the strength of the pilot signal generated by the current BTS, then the mobile device returns to the continuous scanning mode of step 20, awaiting receipt of a pilot signal from a new BTS in a new registration area.

Similar to the case when mobile device 10 is GPS-enabled, as in the above-described case, the choice of Δ will also affect the rate at which the mobile device checks on whether it is getting closer to entering the new registration area or not. If the mobile device 10 is not GPS-enabled, then the choice of Δ will also affect the number of requests the mobile device makes to get estimated coordinates from the new BTS.

The above method for reducing the rate of registration in CDMA-based 10 mobile networks provides for the prevention of premature registration of mobile device 10 with a new BTS; i.e., registering with the new BTS before making sure that the mobile device 10 has actually left the current registration area.

It is to be understood that the present invention is not limited to the embodiment described above, but encompasses any and all embodiments within the scope of the following claims.

I claim:

1. A method for reducing the rate of registration in CDMA-based mobile networks, comprising the steps of:
   providing a mobile device;
   defining a first registration area and a plurality of secondary registration areas;
   defining a signal strength difference threshold;
   providing a database associated with the mobile device, the database including geographic coordinates defining respective boundaries of the first and secondary registration areas;
   initially positioning the mobile device in the first registration area, the mobile device being in communication with a first base station associated with the first registration area;
   providing first and a plurality of secondary registration pilot signals respectively associated with the first and secondary registration areas;
   scanning for a new registration pilot signal associated with one of the plurality of secondary registration areas;
   receiving the new registration pilot signal and making a first measurement of the strength of the new registration pilot signal;
   determining the geographic location of the mobile device, wherein said step of determining the geographic location of the mobile device includes determination of whether the mobile device is in communication with the global positioning system, wherein if the mobile device is in communication with the global positioning system, the geographic location of the mobile device is defined by a set of global positioning coordinates received by the mobile device from the global positioning system, wherein if the mobile device is not in communication with the global positioning system, the geographic location of the mobile device is determined by measuring the strength of the first registration pilot signal and comparing the strength of the first registration pilot signal with the strength of the new registration pilot signal, wherein if the strength of the first registration pilot signal is greater than the strength of the second registration pilot signal, the geographic location of the mobile device is set within the boundary of the first registration area, and if the strength of the new registration pilot signal is greater than the strength of the first registration pilot signal, the geographic location of the mobile device is set to a geographic location within the particular one of the secondary registration areas;
   comparing the geographic location of the mobile device with the geographic coordinates included in the database; and
   determining whether the mobile device is within the boundary of the first registration area or within the boundary of one of the secondary registration areas, wherein if the mobile device is within the boundary of one of the secondary registration areas, the mobile device registers with a respective secondary base station associated with the particular one of the secondary registration areas, the mobile device returning to said step of scanning for a new registration pilot signal;
   wherein, if the mobile device is within the boundary of the first registration area, the mobile device makes a second measurement of the strength of the new registration pilot signal, and if the difference between the second measurement and the first measurement is less than the signal strength difference threshold, then the mobile device returns to said step of scanning for a new registration pilot signal,
   further, if the difference between the second measurement and the first measurement is greater than the signal strength difference threshold, then the mobile device returns to said step of determining the geographic location of the mobile device.

2. The method for reducing the rate of registration in CDMA-based mobile networks according to claim 1, wherein if the mobile device is not in communication with the global positioning system, and if the strength of the new registration pilot signal is greater than the strength of the first registration pilot signal, the geographic location of the mobile device is estimated based upon intensity and directional properties of the new registration pilot signal generated by the particular secondary base station associated with the particular one of the secondary registration areas.

* * * * *